United States Patent
Doerr et al.

(12) 
(10) Patent No.: US 6,532,090 B1
(45) Date of Patent: Mar. 11, 2003

(54) WAVELENGTH SELECTIVE CROSS-CONNECT WITH REDUCED COMPLEXITY

(75) Inventors: Christopher Richard Doerr, Middletown Township, Monmouth County, NJ (US); Benny Peter Mikkelsen, Atlantic Highlands, NJ (US); Gordon Thomas Wilfong, Gillette Township. Morris County, NJ (US); Martin Zirngibl, Middletown Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/467,429

(22) Filed: Feb. 28, 2000

(51) Int. Cl.[7] .............................................. H04J 14/02
(52) U.S. Cl. ........................................ 359/128; 385/17
(58) Field of Search ................................ 359/128, 124, 359/117; 385/17

(56) References Cited

U.S. PATENT DOCUMENTS

| | | | | |
|---|---|---|---|---|
| 5,694,499 A | * | 12/1997 | Tillerot et al. ................. | 385/24 |
| 5,724,167 A | * | 3/1998 | Sabella ......................... | 359/128 |
| 5,825,517 A | * | 10/1998 | Antoniades et al. ........ | 359/117 |
| 5,889,600 A | * | 3/1999 | McGuire ...................... | 359/128 |
| 5,937,117 A | * | 8/1999 | Ishida et al. ................... | 385/24 |
| 5,940,551 A | * | 8/1999 | Oberg .......................... | 385/17 |
| 6,175,432 B1 | * | 1/2001 | Wu et al. ...................... | 359/124 |
| 6,317,529 B1 | * | 11/2001 | Kashima ....................... | 385/16 |
| 6,333,799 B1 | * | 12/2001 | Bala et al. .................... | 359/128 |

* cited by examiner

*Primary Examiner*—Kinfe-Michael Negash
(74) *Attorney, Agent, or Firm*—John A. Caccuro

(57) ABSTRACT

A wavelength division multiplex (WDM) cross-connect architecture that can selectively cross-connect, at a wavelength granularity, wavelength channels from any of a plurality of input WDM optical facilities (e.g., fibers) to any of a plurality of output WDM optical facilities. The architecture is based on multi-wavelength modules, which are capable of routing simultaneously N wavelengths. The number of required modules scales only with $k^2$ or less (i.e., $k^2$ modules with N complexity), where k is the number of input/output fibers. The significant reduction in complexity is traded for a decrease in blocking performance; one of the disclosed architectures is strictly non-blocking in the space domain and rearrangeably non-blocking in the wavelength domain, whereas two others are rearrangeably non-blocking in both the wavelength and space domain. Since the wavelength channels are optically multiplexed in the interconnection fibers, only a small number of optical amplifiers are needed to compensate for the inevitable transmission loss in the interconnection fabric.

16 Claims, 11 Drawing Sheets

FIG. 10

Table 1

| | # WI (1004) | # 2x2 WSC (1005) | # 1x1 WSC (1006) | # fibers (1007) | # stages (1008) | Loss (1009) | # OAs (1010) | x-talk (1011) |
|---|---|---|---|---|---|---|---|---|
| WI-Be (1001) | $k$ | $k(2\log k - 1)/2$ | — | $4(\# WSC)$ | $2\log k - 1$ | $10(\# stages)$ | $k/3(\# stages)$ | $2\log k - 1$ |
| $k=8$ | 8 | 20 | — | 80 | 5 | 50 dB | 16 | 7 dB |
| Be/2 (1002) | $k$ | $k(2\log k)/2$ | — | $4(\# WSC)$ | $2\log k$ | $10(\# stages)$ | $k/3(\# stages)$ | $2\log k$ |
| $k=8$ | 8 | 24 | — | 96 | 6 | 60 dB | 16 | 8 dB |
| BroadC (1003) | $k$ | — | $k^2$ | $4(\# WSC)$ | 1 | $10 + 2k(dB)$ | $k/30(Loss)$ | $k$ |
| $k=8$ | 8 | — | 64 | 256 | 1 | 30 dB | 8 | 9 dB |

○ = WI
□ = 2x2 N-WSC
◁ = 1x(log k) N-WSC

○ = WI
□ = 2x2 N-WSC
◁ = 1x(log k) N-WSC

WAVELENGTH SELECTIVE CROSS-CONNECT WITH REDUCED COMPLEXITY

TECHNICAL FIELD OF THE INVENTION

The present invention relates to an optical wavelength cross-connect for use in wavelength division multiplexed (WDM) systems and, more particularly, to a wavelength cross-connect having reduced complexity.

BACKGROUND OF THE INVENTION

The next generation wavelength division multiplexed (WDM) transmission systems will carry as many as 80 channels or 400 Gb/s total capacity per fiber. Consequently, large optical cross-connects will be needed in the near future to interconnect multiple fiber transmission lines in a central office. As an example, a cross-connect for 8 incoming fibers and 8 outgoing fibers each carrying 80 channels, will need 640 input/output ports each one capable of accepting at least OC-48 rate and eventually OC-192. Current cross-connects are based on electronic switch fabrics; they first time division demultiplex the high incoming rate (for example OC-48) into lower rates (for example OC-1) and then cross-connect at the lower rate, thus they have a very fine granularity. However, with the emergence of WDM systems that carry large numbers of wavelength channels, a new level of cross-connects with wavelength granularity seem to be highly desirable.

In principle, one can build a much larger cross-connect based on smaller cross-connects. However, to maintain strictly non-blocking characteristics the complexity of a cross-connect in practice generally scales like $k^2$ where k is the number of input/output ports. Thus, a 1000×1000 cross-connect could, in principle, be built out of one hundred 100×100 cross-connects (the size of the largest currently available cross-connect), but from a cost and size point of view, this would not be practical. Optical cross-connects have been demonstrated by routing the channels in the wavelength domain. An example is the MONET cross-connect [1] (Note in this specification, a reference to another document is designated by a number in brackets to identify its location in a list of references found in the Appendix) However, this type of cross-connect is blocking in the wavelength domain and does not scale well either.

In its most general architectural form, as shown in FIG. 1, a strictly non-blocking optical cross-connect with k input fibers and N wavelength channels per fiber consist of 5 stages [2, 3]; demultiplexing, wavelength interchanging/adaptation, space switching, wavelength inter-changing/adaptation, and finally, a multiplexing stage. The complexity of the cross-connect in FIG. 1 will generally scale with $(kN)^2$ if the fabric is based on space switches only.

Therefore, there is a continuing need to reduce the complexity of the cross-connects used in WDM systems.

SUMMARY OF THE INVENTION

The present invention describes a new WDM cross-connect architecture that can selectively cross-connect wavelength channels from any of a plurality of input WDM optical facilities (e.g., fibers) to any of a plurality of output WDM optical facilities. We describe three new cross-connect architectures (apparatuses) that are based on multi-wavelength modules, which are capable of routing simultaneously N wavelengths. In our architectures, the number of required modules scales only with $k^2$ or less (i.e., $k^2$ modules with N complexity) rather than $(kN)^2$ as does prior art architectures. This significant reduction in complexity is traded for a decrease in blocking performance; one of the disclosed architectures (FIG. 7) is strictly non-blocking in the space domain and rearrangeably non-blocking in the wavelength domain, whereas the two others (FIGS. 8 and 9) are rearrangeably non-blocking in both the wavelength and space domain. Another very important advantage of the proposed architectures is their utilization of amplifiers. Since the wavelength channels are optically multiplexed in the interconnection fibers, only a small number of optical amplifiers (one or two per fiber) are needed to compensate for the inevitable transmission loss in the interconnection fabric.

More particularly, our invention is directed to an optical cross-connect apparatus having k input ports and k output ports, k>1, each input port for receiving an M channel wavelength division multiplexed (WDM) signal, M>1, the cross-connect apparatus comprising (1) k wavelength interchange (WI) modules, each WI module connected to couple a WDM signal received at one of the k input ports to a k×k wavelength selective optical cross-connect (WSC) apparatus, a least one WI module for changing a wavelength assignment of one or more channels of the M channels of the WDM signal received at an input port, and (2) said k×k WSC apparatus for selectively cross-connecting each wavelength of the k input ports to any of the k output ports of the cross-connect apparatus.

According to other aspects of the invention, the k×k WSC apparatus may be implemented using (1) k 1×k splitters and k k×1 combiners interconnected by an array of $k^2$ 1×1 WSC elements, (2) a multi-stage Beneš array of 2×2 WSC elements, and (3) two, one-half Beneš units interconnected by an array of wavelength interchangers.

In accordance with another aspect of the invention, we describe a method of operating an optical cross-connect apparatus having k input ports and k output ports, k>1, comprising the steps of (1) changing a wavelength assignment of one or more channels of a received M channel wavelength division multiplexed (WDM) signal, M>1, to form a second WDM signal and (2) in response to a control signal, selectively cross-connecting at least two wavelengths of the second WDM signal at at least one of the k input ports to different ports of the k output ports of the cross-connect apparatus.

BRIEF DESCRIPTION OF THE DRAWINGS

In the drawings,

FIG. 10 illustrates a table 1 comparing different characteristics of our three cross-connect apparatuses shown in FIGS. 7, 8, and 9;

In the following description, identical element designations in different figures represent identical elements. Additionally in the element designations, the first digit refers to the figure in which that element is first located (e.g., 202 is first located in FIG. 2).

DETAILED DESCRIPTION

With the arrival of wavelength division multiplexed (WDM) systems carrying large numbers of wavelength channels, it appears that new cross-connect architectures that allow large numbers of wavelength channels to cross-connect at the wavelength granularity level are required. The present invention describes a new WDM architecture which can cross-connect large numbers of wavelength channels at the wavelength granularity. We disclose three types of cross-connect architectures (apparatuses).

In accordance with the present invention, the three new cross-connect architectures are based on multi-wavelength modules, which are capable of routing simultaneously N wavelengths. The number of required modules scales only with $k^2$ or less (i.e., $k^2$ modules with N complexity). The significant reduction in complexity is traded for a decrease in blocking performance; one of the proposed architectures (FIG. 7) is strictly non-blocking in the space domain and rearrangeably non-blocking in the wavelength domain, whereas the two others (FIGS. 8 and 9) are rearrangeably non-blocking in both the wavelength and space domain. Another very important advantage of the proposed architectures is their utilization of amplifiers. Since the wavelength channels are optically multiplexed in the interconnection fibers, only a small number of optical amplifiers are needed (one or two per fiber) to compensate for the inevitable loss in the interconnection fabric.

We will first describe the elements needed for our new cross-connect architecture. We define their functionality and also show some possible implementations. We then show the three cross-connect architectures based on these elements. Then we will compare the different architectures in terms of complexity, cost and important optical properties such as complexity, cost, loss, crosstalk and filter narrowing.

Finally we analyze the various non-blocking properties of the proposed cross-connects as well as those of two additional designs.

1. Optical Cross-connect Building Blocks

The basic building elements in an optical cross-connect are WDM routers, space switches, optical filters, wavelength interchangers and optical amplifiers. We construct new key sub-modules by combining these different functional building elements. In the next paragraphs, we describe the sub-modules being used in our cross-connect apparatus and discuss possible implementations of the modules. First, however, we will depict the general layout of our cross-connect apparatus.

1.1 General Cross-connect Apparatus

Figure 2:
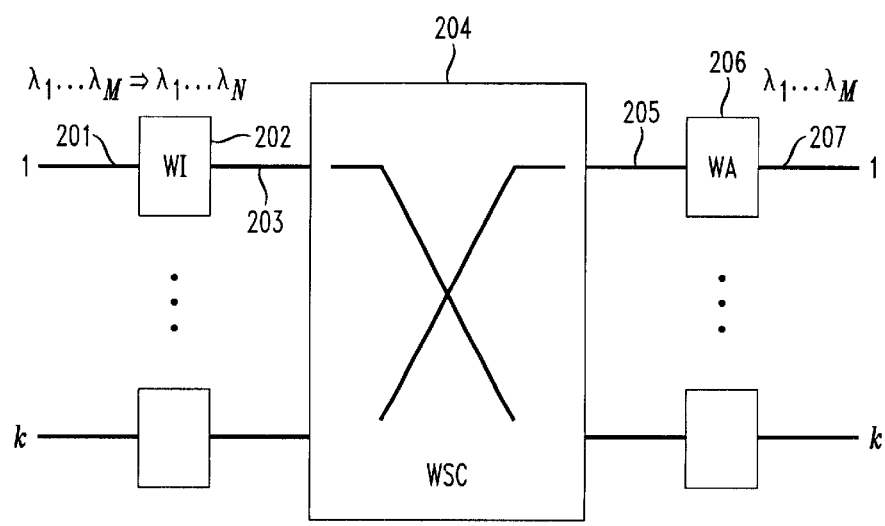
FIG. 2 shows a block diagram of our cross-connect arrangement including wavelength interchangers (WI), a wavelength selective optical cross-connect (WSC) and wavelength adapters (WA)

With reference to FIG. 2, there is shown a general layout of our optical cross-connect apparatus. Each of the k input optical facilities (hereinafter optical fibers) 201 carry a wavelength division multiplexed (WDM) signal including N channels. Wavelength interchange (WI) modules 202 change the wavelength assignment of the N input channels of the WDM signal outputted over fiber 203 to the input of a wavelength selective optical cross-connect (WSC) 204. The WSC 204 is a wavelength selective space switch that routes wavelength channels independently from any of the k inputs to any of the k outputs.

Note in WI module 202, if the channel wavelengths 1–M are different from channel wavelengths 1–N, then wavelength adapters (WA) 206 are required to change the channel wavelength assignments of the WDM signal received from WSC 204 back to the channel wavelengths 1–M to be sent over the output optical facilities 207 (hereinafter optical fibers). The WA 206 might also be needed at the output to allow for a multi-vendor environment (where different vendors would probably have different wavelength assignments for the different channels). Note, that two channels cannot have the same wavelength at the output of the WI module 202 since all channels are multiplexed onto a single fiber. Consequently, our cross-connect apparatus of FIG. 2 is at most rearrangeably non-blocking in the wavelength domain. It can, however, be shown that for two of our architectures (FIGS. 7 and 8), at most 2k connections out of the Nk connections have to be rearranged to unblock a demand. In addition, the blocking performance can be improved by having more internal wavelengths than transmission wavelengths (i.e., N>M). In its most general case, M can also be less than N if we have more than one output fiber 203 from the WI module 202.

Figure 3:
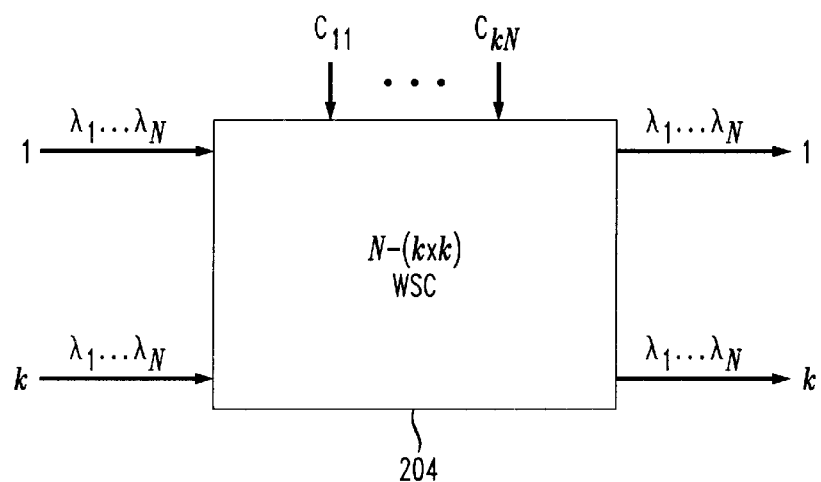
FIG. 3 shows a WSC with k incoming fibers each carrying N wavelengths. Each wavelength can be cross-connected amongst k fibers, but not between different channels (no wavelength interchange)

The basic building module for the WSC 204 space switch is shown in FIG. 3 and is discussed in the next paragraph.

1.2 The Wavelength Selective Optical Cross-connect (WSC)

FIG. 3 shows a WSC 204 with k incoming fibers each carrying N wavelengths. Each wavelength can be cross-connected amongst k fibers, but not between different channels (no wavelength interchange). The WSC 204 is the key sub-module in our three cross-connect apparatus configurations FIGS. 7–9 to be described later. The N wavelength k×k WSC has k input ports and k output ports. It consists conceptually of k WDM demultiplexer/multiplexers and of N non-blocking k×k cross-connects. Each of the k×k cross-connects allows cross-connecting one of the wavelength channels on each fiber, say wavelength channel $\lambda_i$. Since the k×k WSC (hereinafter the designation WSC is understood to be able to process N wavelength channels) does not allow the wavelength of the individual channels to change, it is blocking in the wavelength domain. The control leads $C_{11}$–$C_{iN}$ are used to control the cross-connection of wavelengths $\lambda_1$–$\lambda_N$ on each of the k fibers into WSC 204.

Figure 4A:
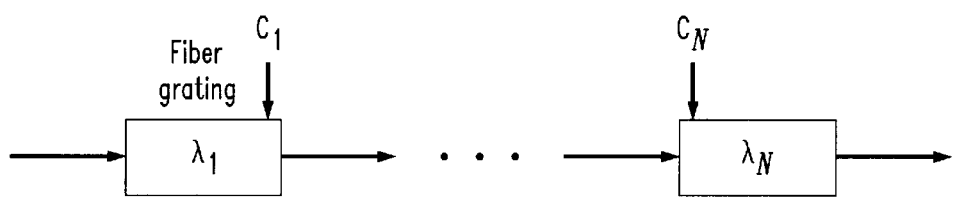
FIG. 4 shows examples of N wavelength 1×1 WSC which is implemented (a) using a multi-wavelength filter that can be assembled, for instance, from tunable fiber gratings or (b) using two back-to-back optical MUXs interconnected by an array of semiconductor optical amplifiers (SOA)
Figure 4B:
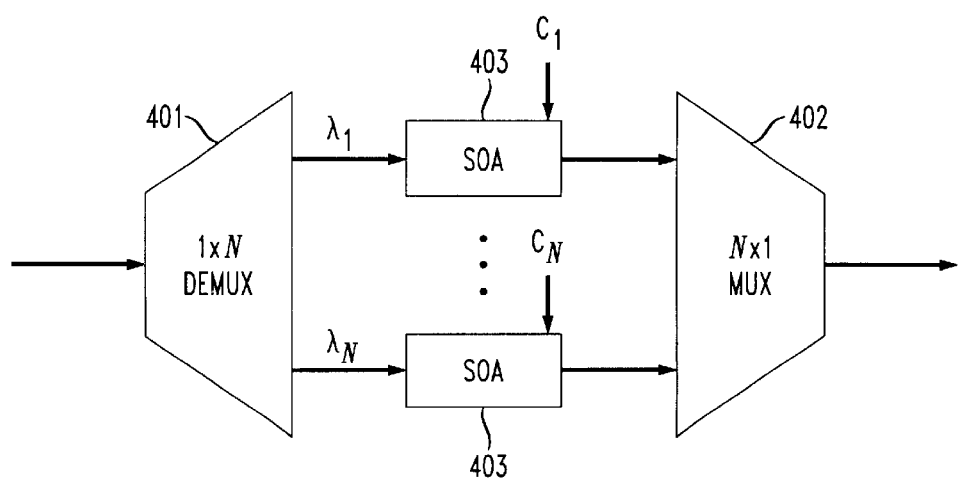

FIGS. 4a and 4b show two examples of N wavelength 1×1 WSC. A 1×1 WSC is simply a multi-wavelength filter (MWF) that has individual control for each channel. Each channel can thus be passed or blocked by the MWF. As shown in FIG. 4a, such a device can be built with a tunable fiber grating for each wavelength ($\lambda_1$–$\lambda_N$) which are individually controlled ($C_1$–$C_N$) to pass or block each wavelength. Shown in FIG. 4b is a 1×1 WSC module implemented using back-to-back routers (demultiplexer 401 and multiplexer 402) interconnected with an array of semiconductor optical amplifiers (SOAs) 403. Each of the optical amplifiers 403 are individually controlled by signals $C_1$–$C_N$. The FIG. 4b arrangement can be either monolithically integrated in InP [4] or hybridly integrated on a Silica motherboard. Also note that the switching speed of semiconductor optical amplifiers 403 is less than micro-seconds, permitting very fast reconfiguration of the WSC module.

Figure 5A:
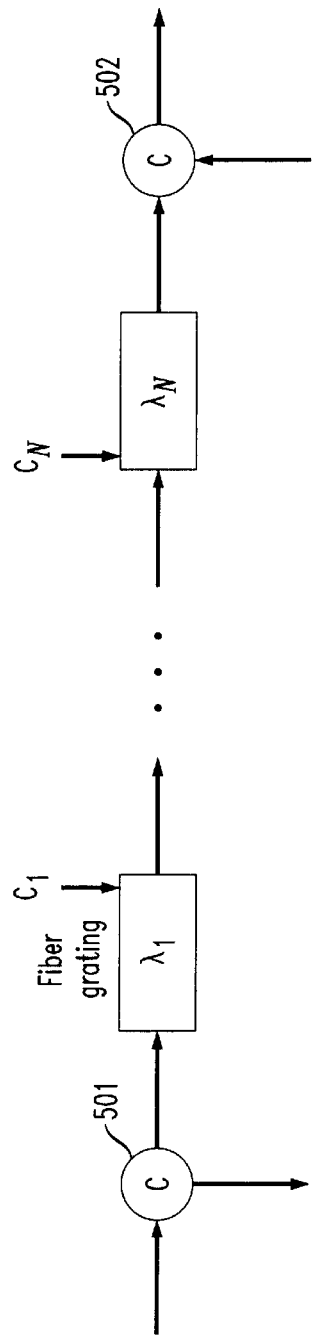
FIG. 5 shows examples of N wavelength 2×2 WSC based on (a) circulators and tunable fiber gratings and (b) on back-to-back chirped optical demuxes and phase controllers.
Figure 5B:
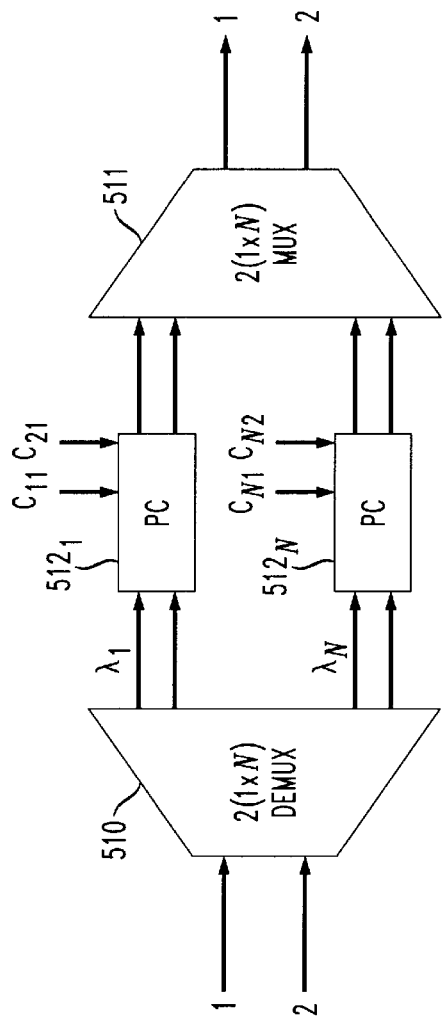

Examples of a 2×2 WSC, e.g., a wavelength selective optical add-drop multiplexer (OADM) are shown in FIGS. 5a and 5b. By simply adding two circulators 501 and 502 to the tunable fiber gratings shown in FIG. 4a, one gets the equivalent functionality of an optical add/drop multiplexer (OADM). A monolithic 16 wavelength OADM [5] has been recently demonstrated by using two back-to-back interleave chirped waveguide grating routers (optical demultiplexers 510 and 511 interconnected by phase controllers (PC) $512_1$–$512_N$. Control signals, e.g., $C_{11}$ and $C_{12}$, control the operation of each of the phase controller, e.g., $512_1$. The MONET[1] cross-connect is an example of an 8 wavelength 6×6 WSC.

1.3 Wavelength Interchanger

Figure 1:
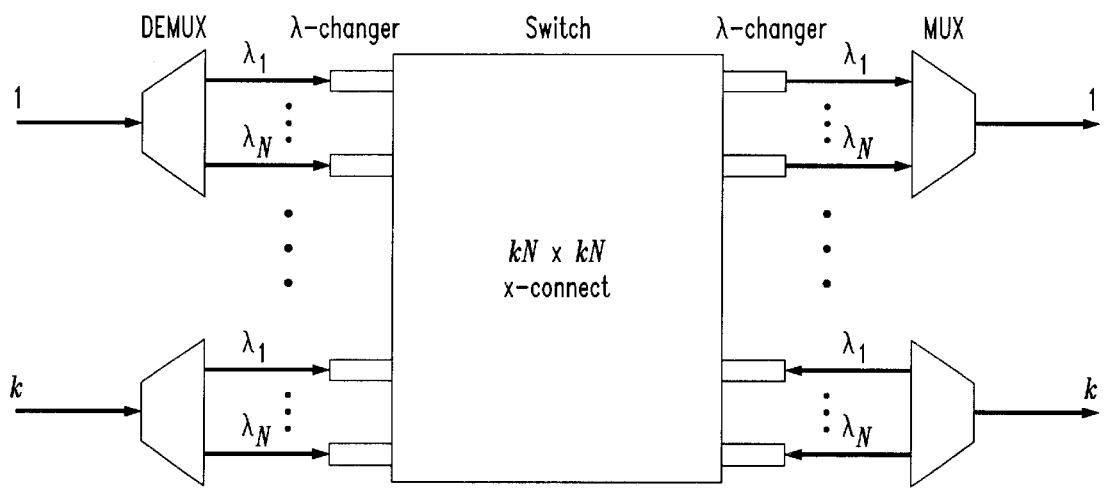
FIG. 1 shows a block diagram of a typical kN×kN cross-connect connected to k fibers carrying N wavelengths. The kN×kN switching fabric is in general strictly non-blocking.
Figure 6A:
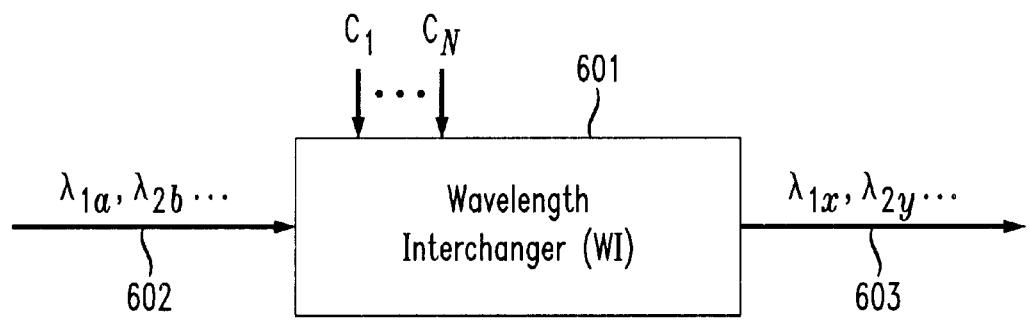
FIG. 6(a) shows a diagram of a wavelength interchanger (WI) that swaps channels and wavelengths.

A wavelength interchanger (WI) is, in general, only capable of converting the wavelength of a single channel [6]. Hence, to construct a WI that allows us to arbitrarily change the wavelengths of N incoming channels, we need to demultiplex the N channels and then convert the wavelengths of each of the different channels individually (see FIG. 1). As shown in FIG. 6a, our cross-connect apparatus requires WI modules 601 that swap channels and wavelengths. The WI 601 has one input fiber 602 and one output fiber 603. Restrictions are, of course, that no two channels on a fiber shall have the same wavelength. Control signals $C_1$–$C_N$ control the wavelength conversion for each wavelength. The WI module 601 may be implemented using all-optical translator/interchanger (FIGS. 6b and c) or using an opto-electronic translator/interchanger (FIG. 6d).

Figure 6B:
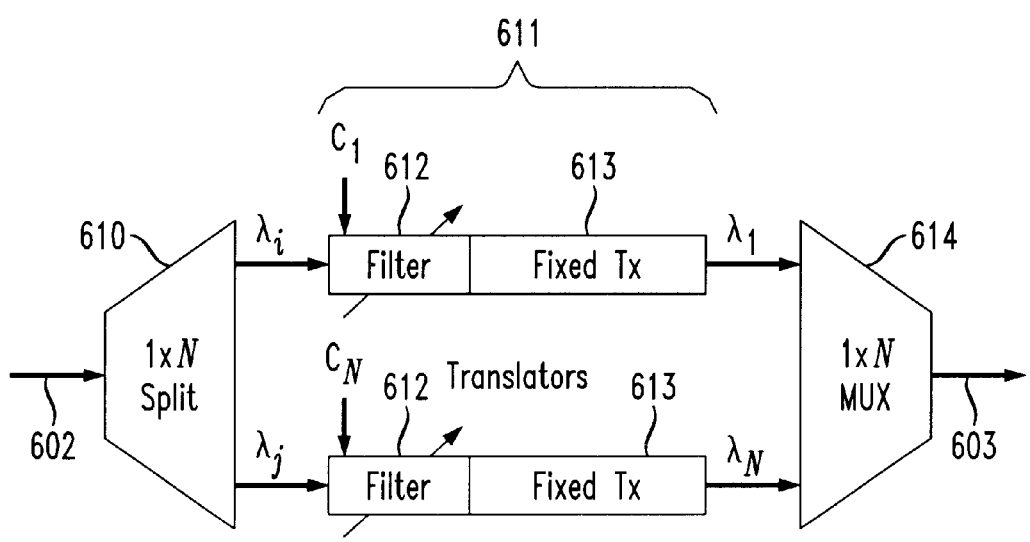
In FIG. 6(b) the WI is shown built using tunable optical filters followed by translators with fixed wavelength transmitters or in (c) being built using fixed filters and tunable lasers or in (d) being built using an optical or electronic space fabric.

With reference to FIG. 6b, a WI module 601 is shown to include a splitter 610 to broadcast the N incoming channels to a translator/interchanger 611 including tunable optical filters 612, which selects a single channel, followed by N optical translators 613 with fixed wavelength transmitters. A multiplexer 614 combines the N wavelength channels into a WDM signal for output fiber 603. The optical filter can be based on the MWF (1×1 WSC) of FIG. 4 described previously. Control signals $C_1$–$C_N$ are used to control wavelength interchange for each channel.

Figure 6C:
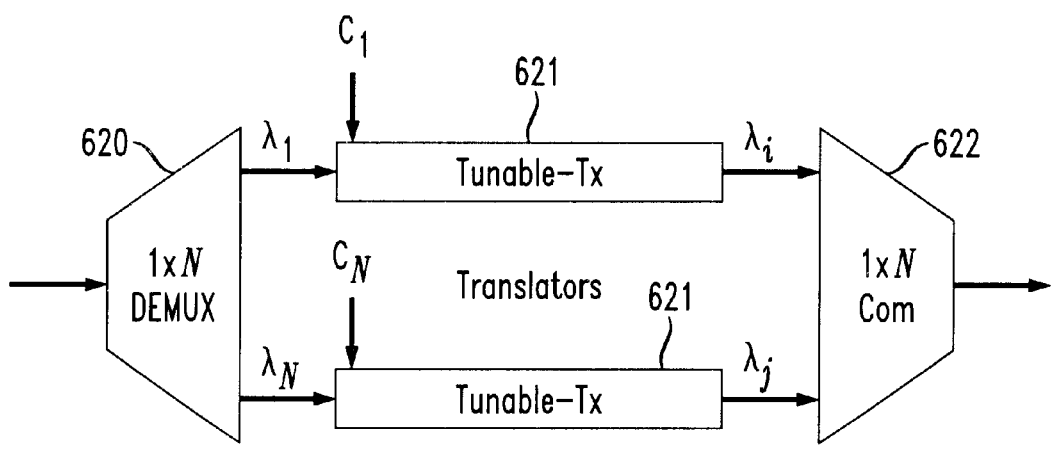
Figure 6D:
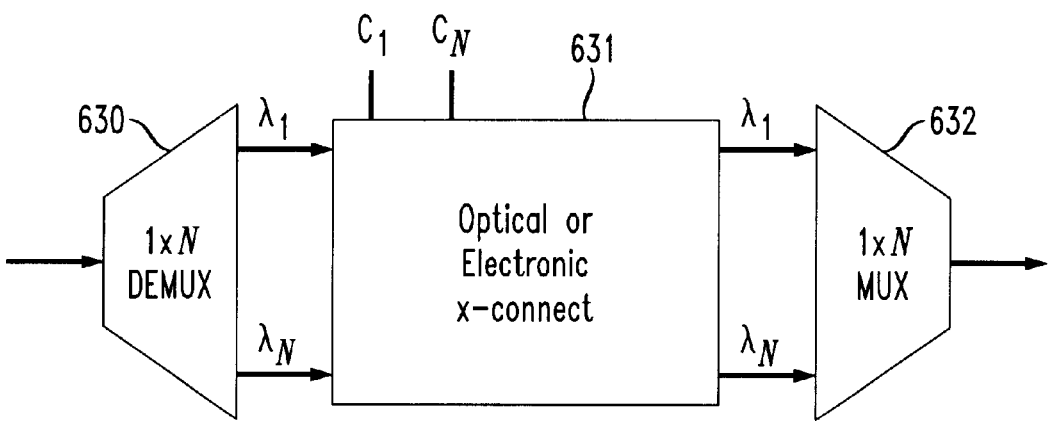

As shown in FIG. 6c, the WI module 601 can also be realized by using fixed filters (i.e., a demultiplexing stage) 620 in front of translators 621 with tunable output wavelengths. Note that this approach requires power combiners 622 to combine the outputs of translator s 621 output, whereas demultiplexers 620 may be used at the input. This is different from the implementation shown in FIG. 6b which uses an input splitter 610 and an output multiplexer 614. Control signals $C_1$-CN are used to control wavelength interchange for each channel.

Other possible implementations of the WI module rely on switches placed in between a demultiplexing stage and an array of translators with fixed output wavelengths. As shown in FIG. 6c, 30 the WI module 601 includes a demultiplexer 630, translator/interchanger 631, and multiplexer 632. As shown in FIG. 6d, the translator/interchanger 631 can be an N×N space switch implemented using an optical switch or an electronic cross-connect 616. Again, control signals $C_1$–$C_N$ are used to control wavelength interchange for each channel.

No matter which of the above embodiments are used, the WI module 601 is a fairly expensive module consisting of at least N active elements like transmitters and filters, and its use has to be minimized as much as possible. In the architectures shown below, we will need k WI modules.

2. Specific Cross-connect Apparatus Embodiments

In the following paragraphs, we will introduce three different cross-connect architectures shown in FIGS. 7, 8, and 9. The general approach in the three architectures is to combine k N-wavelength WI modules with a network of N-wavelength k×k WSCs. It can be shown that a cross-connect based on these two elements can be made strictly non-blocking in the space domain and rearrangeably non-blocking in the wavelength domain. It should be noted that wavelength adapters (WAs) are not shown at the output ports in the layouts for our proposed cross-connects, however, they can easily be included to allow for multi-vendor environment.

Figure 7:
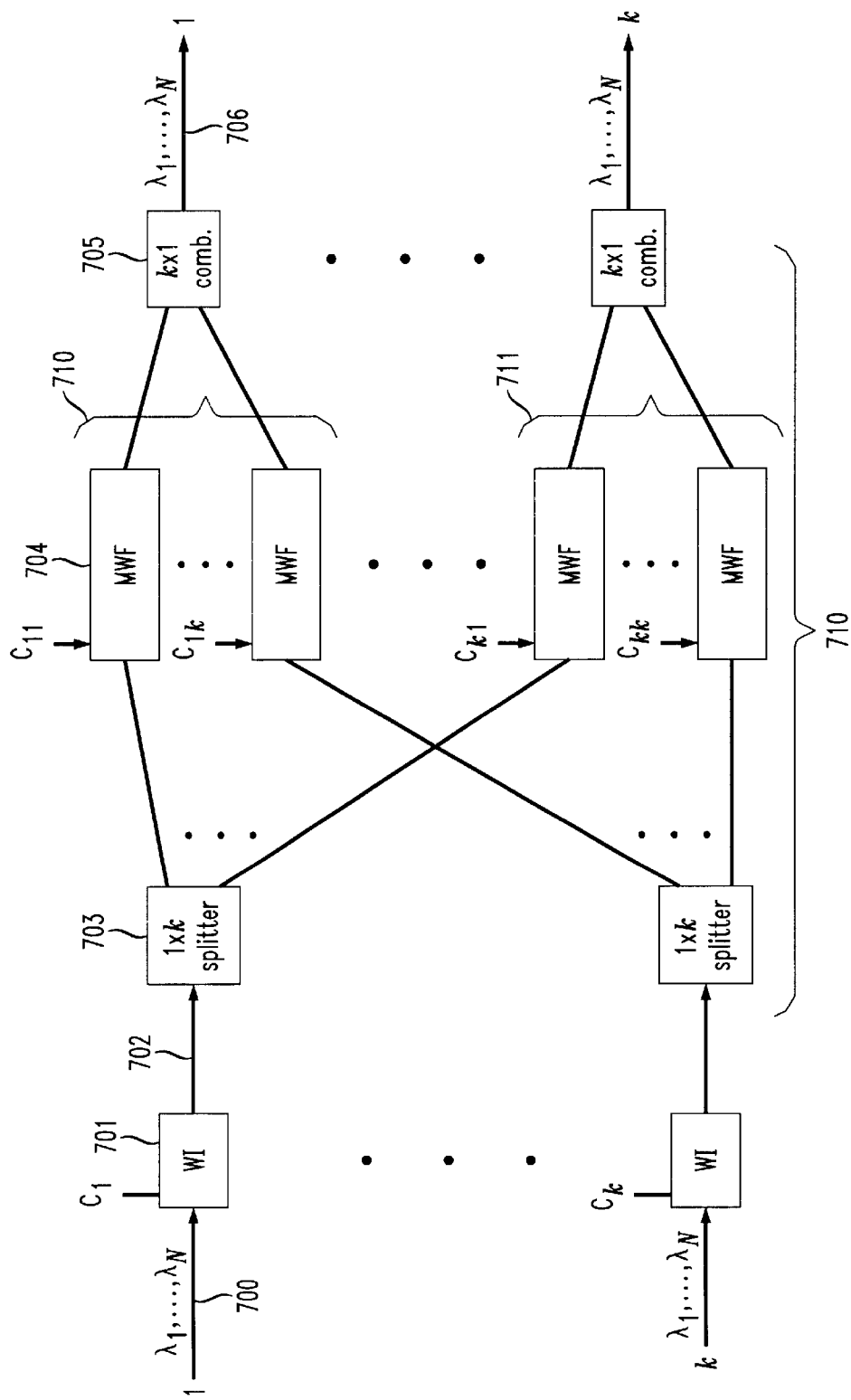
FIG. 7 illustrates an Nk×Nk cross-connect apparatus based on a broadcast-and-select network with ×1 WSCs.

2.1 WI-broadcast & Select (FIG. 7)

With reference to FIG. 7, a broadcast/select cross-connect apparatus is described. The broadcast/select apparatus includes a Nk×Nk cross-connect 710 based on 1×1 WSCs (e.g., multiwave filters—MWF) 704. The WDM signal received on input fiber 700 is wavelength interchanged by WI 701. The WDM signal on fiber 702 from each WI 701 is then split k -times, by splitter 703, and filtered by $k^2$ 1×1 WSCs (MWFs) 704. Wavelength interchange at each WI 701 is controlled by control signals $C_1$–$C_k$. Wavelength selection at each of the k groups of k 1×1 WSCs, 710–711, are controlled by control signals $C_{11}$–$C_{1k}$ through $C_{k1}$–$C_{kk}$, respectively. The outputs from the k groups, 710–711, of 1×1 WSCs 704 are combined by k combiners 705 to form the WDM signal on the output fiber 706. Note that the space fabric 710 for each wavelength is strictly non-blocking. It is also able to perform broadcasting. It is furthermore modular in the sense that one extra input fiber can be accommodated by adding one extra MWF at each output of a splitter. Only one stage of filtering, i.e., 704, is needed and only one stage of amplifiers (e.g., in combiners 705) is needed. Illustratively, if k=8, the coherent crosstalk accumulates by a factor equal to k, i.e., 9 dB for k=8.

Figure 8:
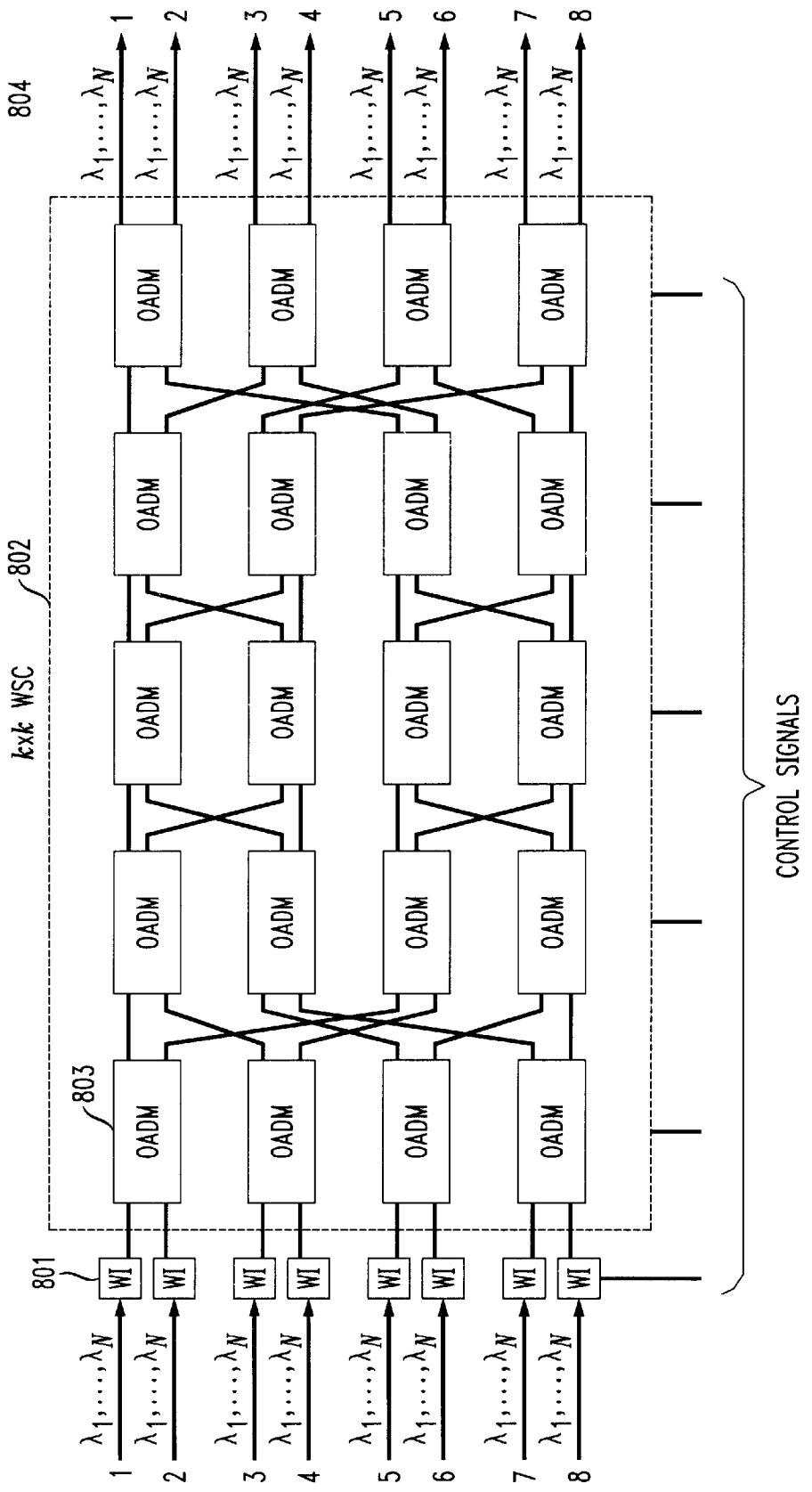
FIG. 8 illustrates an Nk×Nk cross-connect apparatus based on k WIs and a k×k-WSC composed of a Beneš architecture of N wavelength 2×2 WSCs (OADMs)

2.2 WI-Benes̃ (FIG. 8)

With reference to FIG. 8, there is shown an Nk×Nk cross-connect based on k WIs 801 and a k×k-WSC 802 composed of a multi-stage Benes̃ architecture of N wavelength 2×2 WSCs (OADMs) 803.

Illustratively in FIG. 8, k=8, which requires 5 stages of OADMs 803 or a total of 20 to form a rearrangeably non-blocking cross-connect fabric in the space domain. Wavelength interchange at each WI 801 and wavelength switching at each of the OADMs 803 is controlled by an appropriate control signal. Assuming a loss of 10 dB per OADM, the total loss through the fabric is 50 dB, thus two amplifier stages or a total of 16 optical amplifiers (2 for each of the 8 output fiber 804) would be needed. The coherent crosstalk accumulates by a factor equal to the number of stages, i.e., 5 or 7 dB for k=8.

Figure 9:
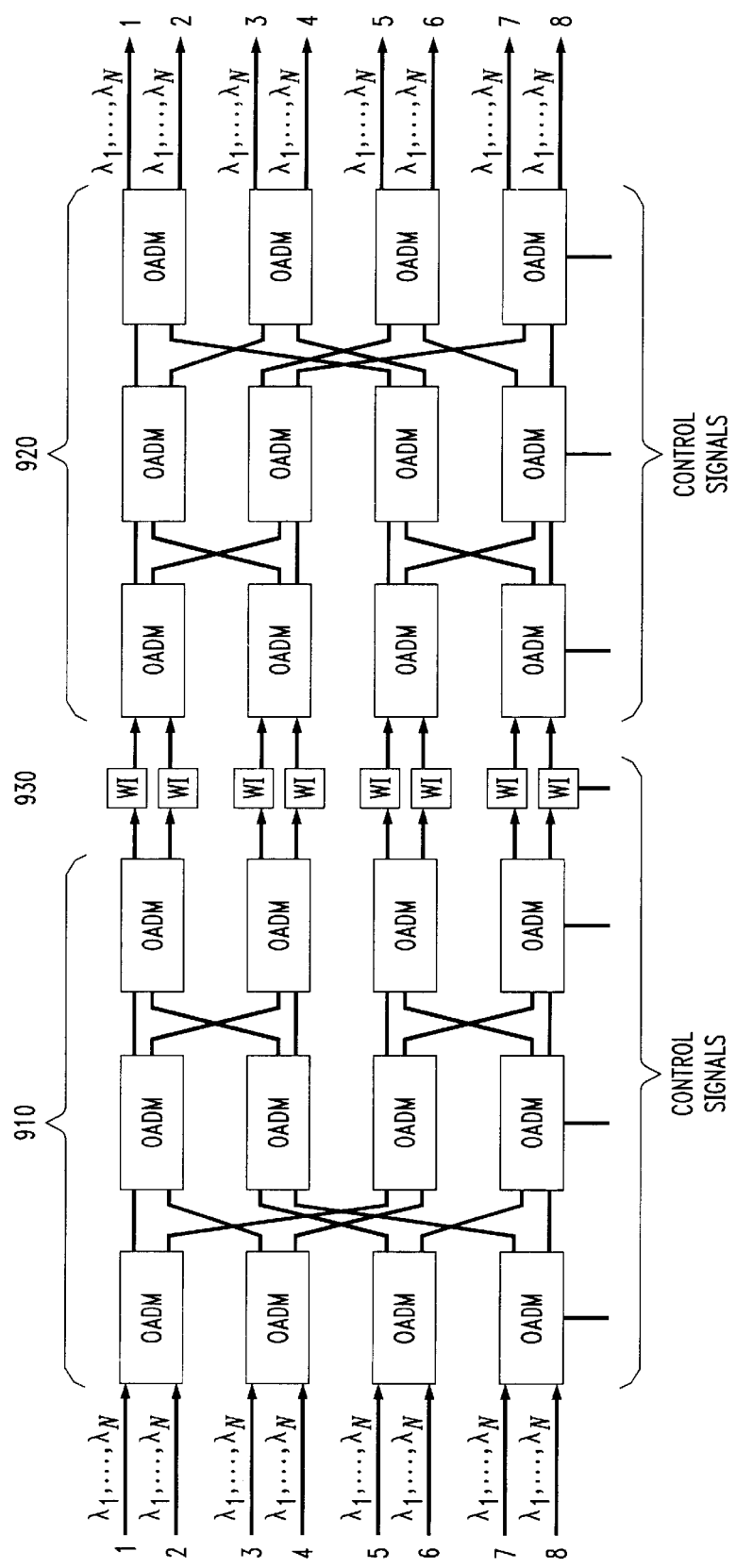
FIG. 9 illustrates an Nk×Nk cross-connect apparatus based on two ½-Beneš k×k-WSCs interconnected by an array of WIs.

2.3 Benes̃/2-WI- WI-Benes̃/2 (FIG. 9)

Shown in FIG. 9 is an illustrative Nk×Nk cross-connect based on two ½-Benes̃ k×k-WSCs, (910 and 920) with an array of WIs (930) in between. In this case, the WIs 930 are put in the middle of the split Beneš architecture at the expense of one additional stage of OADM. Thus by splitting the Beneš architecture, each split Beneš module requires three OADM stages. Wavelength interchange at each WI 930 and wavelength switching at each of the OADMs in 910 and 920 is controlled by a respective control signal. Unlike the single Beneš stage architecture of FIG. 8, this network gives us the flexibility of choosing the output wavelength. However, due to the extra OADM stage (FIGS. 9 uses 6 stages, while FIG. 8 uses only 5 stages) this cross-connect arrangement requires slightly more optical amplification and the coherent crosstalk accumulates by a factor of 6 or 8 dB for k=8.

3. Comparison of the Three Cross-connect Apparatuses

Shown in FIG. 10, Table 1, we compare the three architectures FIG. 8—1001, FIG. 9—1002, and FIG. 7—1003 for an 8 fiber system, i.e., k=8. The three architectures are compared in terms of number of WI modules 1004, 2×2 WSCs 1005, 1×1 WSCs 1006, fiber interconnections 1007, OADM stages 1008, loss 1009, optical amplifiers (OAs) 1010, and crosstalk 1011. For these comparisons, a 10 dB loss per WSC and 30 dB gain per OA are assumed.

In terms of number of WSC modules, 1005, the WI-Beneš apparatus of FIG. 8, 1001, has the best performance. The Beneš/2-WI-Beneš/2 apparatus of FIG. 9, 1002, has slightly more WSC modules, 1005, but it gives us output wavelength flexibility. However it also has the most OADM stages, 1008, resulting in the highest loss, 1009, and filter narrowing.

The WI-broadcast/select apparatus of FIG. 7, 1003, is clearly best from a filtering narrowing 1008, optical loss 1009, and blocking perspective at the expense of the largest number of modules, 1006, needed and more accumulated crosstalk, 1011. The comparison is, however, not completely straightforward, because the WI-broadcast/select apparatus needs only 1×1 WSCs (MWF) versus 2×2 WSCs (OADMs) used for the Beneš type networks (the complexity of one 2×2 WSC corresponds roughly to two 1×1 WSCs).

The WSCs are allowed to be polarization dependent in the WI-Beneš and the WI-broadcast/select architectures, since the WI modules at the input of the cross-connects perform polarization conversion as well (WSCs with polarization maintaining fiber pigtails are however required).

The three architectures are all rearrangeably non-blocking in the wavelength domain. Furthermore, it can be shown that at most 2k connections out of the Nk connections have to be rearranged to unblock a demand for the WI-Beneš and the WI-broadcast/select architectures. The number of required connections that have to be rearranged for the Beneš/2-WI-Beneš/2 to unblock a demand is more complicated to predict. Though, the wavelength blocking can be reduced for all three architectures by having more internal wavelengths than transmission wavelengths. This, however, requires that the cross-connect apparatus be equipped with wavelength adapters at the output, which might be required anyway to accommodate a multi-vendor environment.

For all three architectures, the cost of the cross-connect apparatus is expected to be dominated by the cost of the optical translator/converter units (e.g., 611) in the WI modules, which are inevitable in any cross-connect architecture. Therefore, our architectures of FIGS. 7, 8, and 9 are very attractive for the realization of practical and cost effective cross-connect apparatus.

Figure 11:
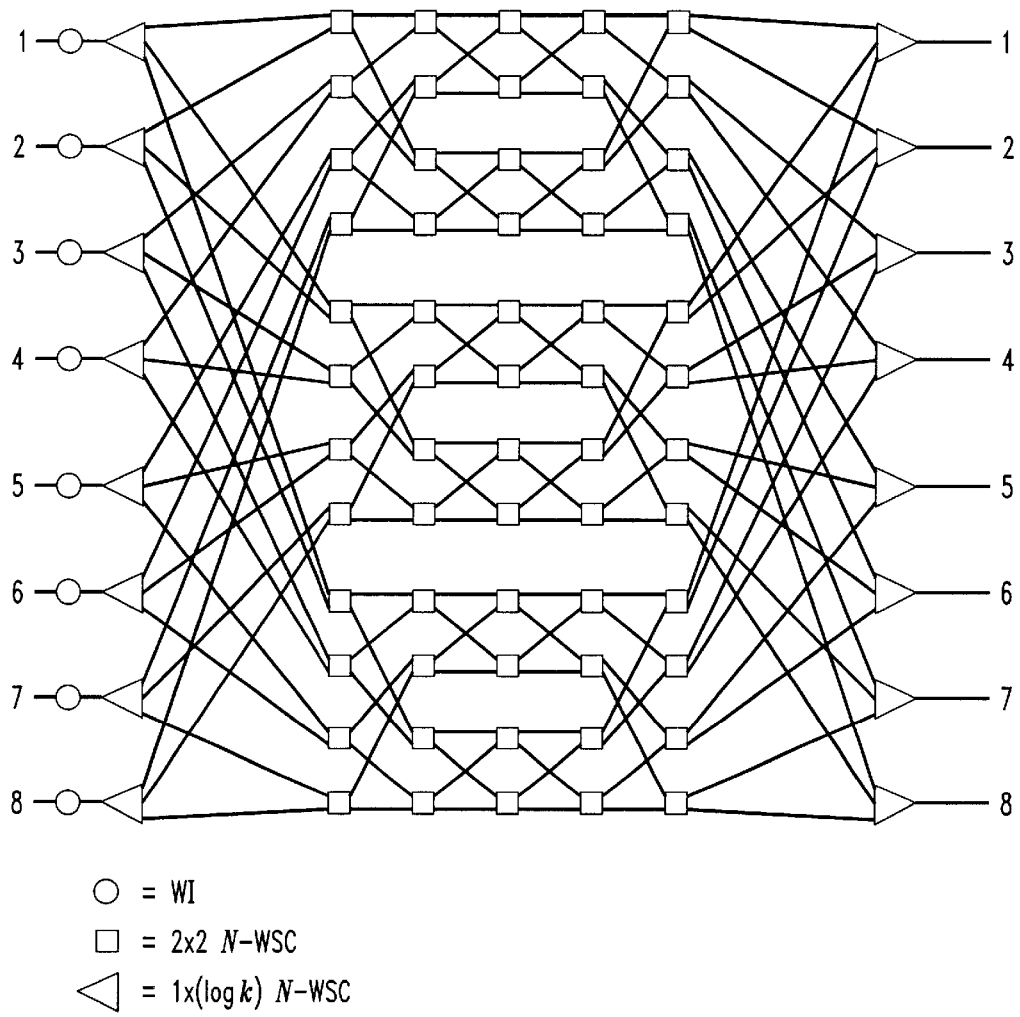
FIG. 11 illustrates an Nk×Nk cross-connect apparatus based on a Cantor network.
Figure 12:
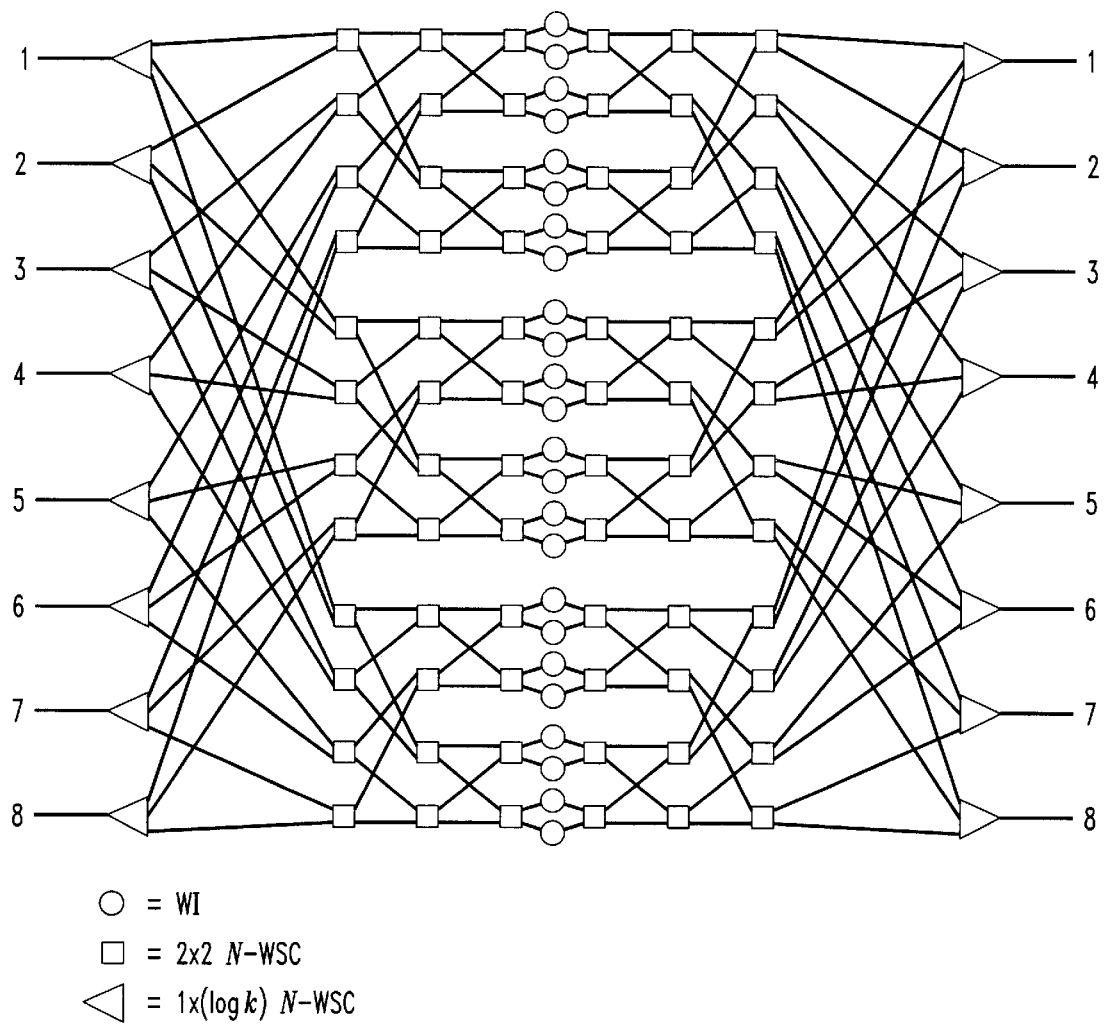
FIG. 12 illustrates an Nk×Nk cross-connect apparatus based on a two ½-Cantor networks.

Finally, if the number of wavelengths in the output of the WI's and in the WSC, N, is greater then the number of wavelengths in each input fiber, M, the blocking reduces; and the entire fabric, for the architecture of FIG. 7, becomes strict-sense nonblocking when $N \geq 2M$, provided we allow only N total channels per output fiber 4. Cantor Networks (FIGS. 11 and 12)

One can also make the fabric with elements other than 1×1 or 2×2 WSC's. One type is a Cantor network [14], employing q×p WSC's, $p \geq 2$, $q \geq 2$. For example, FIG. 11 shows a WI-Cantor (k=8) fabric used in our cross-connect, with a 1×3 and 2×2 WSC's. It has the same blocking characteristics as the broadcast and select version (FIG. 7), but it has order $k(\log k)^2$ basic elements rather than $K^2$. Also similar to the Beneš/2-WI-Beneš/2 network, one can make a Cantor/2-WI-Cantor/2 network, as shown in FIG. 12 (k=8). This fabric is strict-sense nonblocking in both space and wavelength, but it requires k log k WI's instead of k.

CONCLUSIONS

We have disclosed a number of new optical cross-connect architectures based on multiwavelength modules, which are capable of simultaneously routing N wavelengths. Compared to strictly non-blocking cross-connects, the architectures have a significantly reduced complexity and cost, which is traded for an increased wavelength blocking; one of the proposed architectures (FIG. 7) is strictly non-blocking in the space domain and rearrangeably non-blocking in the wavelength domain, and another (FIG. 8) of the practical designs is rearrangeably non-blocking in both the wavelength and space domain. It can, however, be shown that at most 2k connections out of Nk connections have to 30 be rearranged to unblock a demand in either case. The third design (FIG. 9) is rearrangeably non-blocking in the space domain and never requires rearranging in the wavelength domain. Another very important advantage of the three proposed architectures is their utilization of amplifiers. Since the wavelength channels are optically multiplexed in the interconnection fibers, only a small number of optical amplifiers are needed to compensate for the inevitable loss in the interconnection fabric.

What has been described is merely illustrative of the application of the principles of the present invention. Other methods and arrangements can be implemented by those skilled in the art without departing from the spirit and scope of the invention.

Appendix

References

[1] R. S. Vodhanel et al., "National-scale WDM networking demonstration by the MONET consortium," in *Proc. of OFC'97*, Dallas, February 1997, vol. PD27.

[2] E. Karasan and E. Goldstein, "Optical restoration at the wavelength-multiplex section level in WDM mesh networks," in *Proc. of OFC'98*, San Jose, February 1998, vol. ThJ5.

[3] R. W. Tkach et al., "Fundamental limits of optical transparency," in *Proc. of OFC'98*, San Jose, February 1998, vol. WJ1.

[4] M. Zirngibl et al., "Digitally tunable channel dropping filter/equalizer based waveguide grating router and optical amplifier integration," *IEEE Photon. Lett.*, vol.6, no.4, pp.513–515, April 1994.

[5] C. Doerr, "Proposed wdm cross connect using a planar arrangement of waveguide grating routers and phase shifters," *IEEE Photon. Lett.*, vol.10, no.4, pp.528–530, April 1998.

[6] B. Mikkelsen et al., "Wavelength conversion device," in *Proc. of OFC'96*, San Jose, February 1996, vol. WG1.

[7] D. Cantor, "On construction of nonblocking switching networks," in *Proc. of Symposium on Computer-Communications Networks and Teletraffic*, 1972, pp.253–255.

[8] J. Y. Hui, *Switching and Traffic Theory for Integrated Broadband Networks*, Kluwer Academic Publishers, Norwell, Mass., 1990.

[9] C. Berge, *Graphs and Hypergraphs*, North Holland, Amsterdam, 1973.

[10] O. Ore, *The Four Color Problem*, Academic Press, New York, N.Y., 1967.

[11] V. E. Beneś, *Mathematical Theory of Connecting Networks and Telephone Traffic*, Academic Press, New York, N.Y., 1935.

[12] D. C. Opferman and N. T. Tsao-Wu, "On a class of rearrangeable switching networks, Part:: Control algorithm," *The Bell System Technical Journal*, vol.5, no.50, pp.1579–1600,1971.

[13] Masson, Gingher, and Nakamura, "A sampler of circuit switching networks," *IEEE Computer*, vol.5, pp.32–48, June 1979.

[14] D. Cantor, "On construction of nonblocking switching networks," Proc. of Symposium on Computer-Communications Networks and Teletraffic, pp. 253–255, 1972.

What is claimed is:

1. An optical cross-connect apparatus having k input ports and k output ports, k>1, each input port for receiving an M channel wavelength division multiplexed (WDM) signal, M>1, the cross-connect apparatus comprising k wavelength interchange (WI) modules, each WI module connected to couple a WDM signal received at one of the k input ports to a k×k wavelength selective optical cross-connect (WSC) apparatus, at least one WI module for changing a wavelength assignment of one or more channels of the M channels of the WDM signal received at an input port, and said k×k WSC apparatus for selectively cross-connecting each wavelength of the k input ports individually over a different path through the k×k WSC apparatus to any of the k output ports.

2. The cross-connect apparatus of claim 1 further comprising one or more wavelength adapters (WA) units, each connected to one of the k output ports, for changing a wavelength assignment of one or more channels of the WDM signal received at said one of the k output ports.

3. The cross-connect apparatus of claim 1 wherein the number of possible wavelengths N in the output of the WI's and in the WSC is greater than M.

4. The cross-connect apparatus of claim 1 wherein the k×k WSC apparatus includes k 1×k splitters, each splitter splitting a WDM signal received at an input port into k signals, $k^2$ 1×1 WSC elements arranged in k groups of k 1×1 WSC elements, each WSC element having an input and an output, each input connected to receive one of the k signals from each one of the k splitters, each output being switchably connectable to an input, and k k×1 combiners, each combiner for combining the output signal from each 1×1 WSC element of a group to form an output WDM signal.

5. The cross-connect apparatus of claim 4 wherein the 1×1 WSC elements are implemented using back-to-back optical multiplexers/demultiplexers interconnected by an array of semiconductor optical amplifiers (SOAs).

6. The cross-connect apparatus of claim 4 wherein the 1×1 WSC elements are implemented using tunable fiber gratings.

7. The cross-connect apparatus of claim 1 wherein the k×k WSC apparatus includes a Beneś unit including a multi-stage array of N wavelength 2×2 WSC elements, wherein each input of a 2×2 WSC element of a first array stage connects to one of the k input ports, and wherein each output of a 2×2 WSC element of a last array stage connects to one of the output ports.

8. The cross-connect apparatus of claim 7 wherein the k×k WSC apparatus includes 2×2 WSC elements implemented using back-to-back optical add/drop demultiplexers interconnected by an array of phase controllers.

9. The cross-connect apparatus of claim 7 wherein the 2×2 WSC elements are implemented using circulators and tunable fiber gratings.

10. The cross-connect apparatus of claim 1 wherein the k×k WSC apparatus includes a first Beneś unit including a multistage array of 2×2 WSC elements, a second Beneś unit including a multistage array of 2×2 WSC elements, and a group of k WI modules which interconnect the first Beneś unit to the second Beneś unit.

11. The cross-connect apparatus of claim 1 wherein the k×k WSC apparatus includes a first group of k 1×log k WSC modules, each module for splitting a WDM signal received at one of the k input port into log k signals, a Cantor unit including a multistage array of 2×2 WSC elements for receiving the log k signals from the first group of k 1×log k WI modules, and a second group of k 1×log k WSC modules, each module for combining log k signals from the Cantor unit into a signal for output at one of the k output ports.

12. An optical cross-connect apparatus comprising a first group of k 1×log kWSC modules, each module for splitting a WDM signal received at one of the k input port into log k signals, a first Cantor/2 unit including a multistage array of 2×2 WSC elements for receiving the log k signals from the first group of k 1×log k WI modules, a group of WI modules, each WI module connected to couple signal outputs from the first Cantor/2 unit to a second Cantor/2 unit, the second Cantor/2 unit including a multistage array of 2×2 WSC elements for outputting signals to a second group of k 1×log k WSC modules, the second group of k 1×log kWSC modules having each module combine log k signals from the second Cantor/2 unit into a signal for output at one of the k output ports.

13. The cross-connect apparatus of claim 12 wherein the k×k WSC apparatus includes WSC elements implemented using back-to-back optical add/drop demultiplexers interconnected by an array of phase controllers.

14. The cross-connect apparatus of claim 12 wherein the k×k WSC apparatus includes WSC elements that are implemented using tunable fiber gratings.

15. The cross-connect apparatus of claim 1 wherein one or more of the WI modules are implemented using one of a group of optical circuits including (a) tunable wavelength optical filters followed by translators with fixed wavelength transmitters, (b) fixed wavelength filters and tunable lasers, and (c) fixed wavelength filters and an electronic switch fabric, and (d) fixed wavelength filters and an optical switch fabric.

16. A method of operating an optical cross-connect apparatus having k input ports and k output ports, k>1, comprising the steps of:

changing a wavelength assignment of one or more channels of a received M channel wavelength division multiplexed (WDM) signal, M>1, to form a second WDM signal and in response to a control signal, selectively cross-connecting at least two wavelengths of the second WDM signal at at least one of the k input ports individually over different paths through the cross-connect apparatus to different ports of the k output ports of the cross-connect apparatus.

* * * * *